(12) United States Patent
Colin

(10) Patent No.: US 8,152,247 B2
(45) Date of Patent: Apr. 10, 2012

(54) METHOD OF MANAGING THE POWER SUPPLY TO A NON-REVERSIBLE ACTUATOR FOR A VEHICLE WHEEL BRAKE

(75) Inventor: Emmanuel Colin, Paris (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 562 days.

(21) Appl. No.: 12/367,933

(22) Filed: Feb. 9, 2009

(65) Prior Publication Data

US 2009/0206654 A1 Aug. 20, 2009

(30) Foreign Application Priority Data

Feb. 14, 2008 (FR) ...................................... 08 00803

(51) Int. Cl.
*B60T 8/78* (2006.01)

(52) U.S. Cl. ......... 303/199; 303/126; 244/111; 188/156

(58) Field of Classification Search .................. 303/199, 303/121, 20, 122, 122.04, 122.08, 126, 89; 188/72.7, 72.8, 156, 158, 161, 162, 265; 244/111

See application file for complete search history.

(56) References Cited

U.S. PATENT DOCUMENTS

| 4,494,051 | A | * | 1/1985 | Bailey | 318/400.04 |
|---|---|---|---|---|---|
| 6,460,661 | B1 | * | 10/2002 | Heckmann | 188/158 |
| 6,471,017 | B1 | * | 10/2002 | Booz et al. | 188/72.7 |
| 7,213,891 | B2 | * | 5/2007 | Sibre | 303/20 |
| 7,344,207 | B2 | * | 3/2008 | Sibre | 303/199 |

FOREIGN PATENT DOCUMENTS

| EP | 1 498 332 A1 | 1/2005 |
|---|---|---|
| EP | 1 681 220 A1 | 7/2006 |
| WO | 2007/120267 A2 | 10/2007 |

* cited by examiner

*Primary Examiner* — Pamela Rodriguez

(74) *Attorney, Agent, or Firm* — Sughrue Mion, PLLC

(57) ABSTRACT

A wheel brake for an aircraft, the brake comprising a support (2) that receives at least one electromechanical actuator (1) fitted with a pusher (8) facing friction elements (3) and movable under drive from an electric motor (6) to apply a braking force selectively against the friction elements. The actuator is non-reversible such that a reaction force applied on the pusher cannot cause the electric motor to turn, and the actuator is associated with elements (30, 31, 32, 33, 34) for selectively switching off an electric power supply to the electric motor, which elements allow power to be delivered to the actuator in normal circumstances, and switch off the power if (a) the measured speed of rotation ($w_{mes}$) of the electric motor drops below a first predetermined threshold ($S_1$); and (b) the commanded speed of rotation ($\bar{\omega}$) of the electric motor drops below a second predetermined threshold ($S_2$).

2 Claims, 1 Drawing Sheet

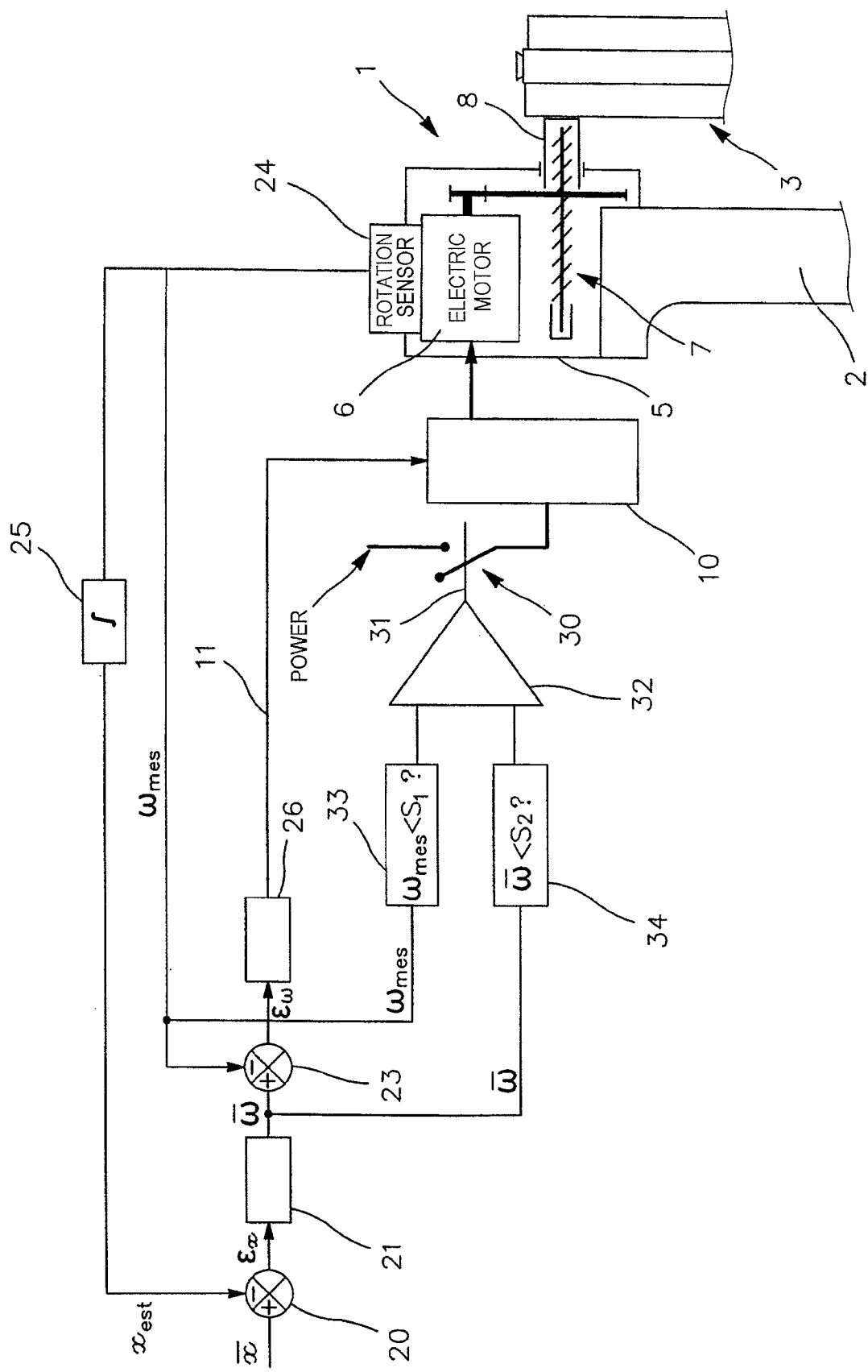

METHOD OF MANAGING THE POWER SUPPLY TO A NON-REVERSIBLE ACTUATOR FOR A VEHICLE WHEEL BRAKE

The invention relates to a method of managing a non-reversible electromechanical actuator for a brake of a vehicle, in particular of an aircraft.

BACKGROUND OF THE INVENTION

Aircraft wheel brakes are known that comprise a support receiving at least one electromechanical actuator fitted with a pusher that is movable facing friction elements in order to apply a braking force selectively thereto. In general, the actuator is reversible and it is fitted with a blocking member for blocking the pusher in position such that the pusher can be blocked while it is exerting a force on the friction elements.

The blocking member serves to provide a parking function, which consists in exerting a force on the friction elements when the aircraft is stationary and switched off. For this purpose, at least one actuator is operated so that its pusher exerts a force on the friction elements, the blocking member is activated to block the pusher in position, and the power supply to the motor of the actuator is switched off. In practice, the blocking member is a failsafe brake that releases the pusher when the blocking member is powered, but that blocks the pusher when the blocking member is no longer powered. The electrical power supply of the aircraft can then be disconnected, the parking force being provided even though the motor of the actuator and the blocking member are themselves no longer powered.

Under normal circumstances, even in the absence of braking, the actuator member is powered, and as a result so that the actuator consumes electrical energy.

Nevertheless, other situations exist in which the blocking member can be activated even though the aircraft is not electrically powered. Whereas under normal circumstances the blocking member is powered so as to leave the pusher free to move, it is possible when the aircraft is stationary and the pilot presses against the brake pedals for quite a long time, for the motors of the actuators to heat up needlessly. It is therefore known, in particular from document FR 2 880 602, to pass automatically into parking mode when activating the blocking member, i.e. when switching off its power supply. The pusher of the actuator is then blocked in position and the power supply to the motor of the pusher can then also be switched off. Under such circumstances, the actuator no longer consumes energy, while nevertheless maintaining a force on the friction elements.

OBJECT OF THE INVENTION

The invention seeks to propose a novel electromechanical actuator brake enabling the consumption of electrical energy to be reduced and enabling both the complexity and the electrical energy consumption to be reduced compared with existing actuators.

BRIEF SUMMARY OF THE INVENTION

The invention provides a wheel brake for a vehicle, in particular for an aircraft, the brake comprising a support that receives at least one electromechanical actuator fitted with a pusher facing friction elements and movable under drive from an electric motor to apply a braking force selectively against the friction elements, wherein the actuator is non-reversible such that a reaction force applied on the pusher cannot cause the electric motor to turn, and the actuator is associated with means for selectively switching off an electric power supply to the electric motor, which means allow power to be delivered to the actuator in normal circumstances, and switch off said power if:

the measured speed of rotation of the electric motor drops below a first predetermined threshold; and
the commanded speed of rotation of the electric motor drops below a second predetermined threshold.

Servo-controlling the actuator, whether in force or in position, generally requires an internal speed feedback loop to be implemented. Advantage is therefore taken of this loop to perform tests on the commanded speed, which is provided as an input to the speed loop, and on the speed as measured by a rotary sensor, which is also to be found in the motor and which serves to control the power supply of the motor. The tests therefore apply to parameters that are internal to the servo-control of the motor, and they can therefore be performed independently of the manner (position or force) in which the actuator is servo-controlled.

By means of these two tests, it is ensured firstly that no movement is required of the pusher and secondly that the pusher is indeed stationary, whereupon the power supply to the actuator is switched off such that the pusher remains blocked in position because of the non-reversibility of the actuator.

In the event of an order being issued to move the pusher, a speed of rotation is required of the motor such that the commanded speed signal rises back above the associated threshold. The conditions for switching off the power supply are no longer satisfied and the power supply to the electric motor of the actuator is then reestablished. In a variant, it can be decided to select conditions for switching the power supply back on that are different from the conditions for switching the power supply off. In particular, the controlled speed threshold beyond which the power supply is switched back on need not be identical to the threshold used for switching the power supply off.

BRIEF DESCRIPTION OF THE DRAWING

The invention can be better understood with reference to the sole FIGURE, which is a diagram of the servo-control of an electromechanical brake actuator including power supply management of the invention.

DETAILED DESCRIPTION OF THE INVENTION

FIG. 1 shows an electromechanical actuator 1 mounted on a support 2 that extends facing friction elements 3, here a stack of disks comprising rotor disks that rotate with the wheel to be braked and disposed in alternation with stator disks that do not rotate with the wheel to be braked. The actuator 1 comprises a body 5 in which an electric motor 6 is located for the purpose of acting (either via gearing as shown, or else directly) to drive the rotary portion of a screw-and-nut connection 7 in which the non-rotary portion is movable linearly and forms a pusher 8 adapted to press selectively against the stack of disks 3 in response to a brake order.

According to the invention, the actuator is of the non-reversible type, i.e. a torque generated by the electric motor 6 drives the pusher 8 in linear movement, but a reaction force exerted by the disks 3 on the pusher 8 cannot cause the pusher 8 to move linearly nor can it cause the electric motor 6 to rotate. To make the actuator non-reversible, it is possible to use an non-reversible electric motor 6, e.g. a high-torque piezoelectric motor. It is also possible to achieve such non-reversibility by using a non-reversible transmission between the electric motor 6 and the pusher 8, e.g. a transmission via a roller screw of small pitch.

Advantageously, a transmission is used in which the efficiency in the reverse direction is small, but nevertheless not zero, in association with a motor that is reversible. Thus, the pusher is blocked for reaction forces that do not exceed a given limit force, but it reverses for reaction forces that are equal to or greater than said limit force. The actuator then behaves like a force limiter when it is not powered, being non-reversible up to the limit force, and reversible beyond.

The electric motor 6 is powered by a converter 10 that receives electricity from the power network of the aircraft and that modulates the electrical power delivered to the electric motor 6 as a function of command 11 generated in response to a position setpoint $\bar{x}$. More precisely, the position setpoint $\bar{x}$ is delivered to the positive input of a comparator 20 having a negative input that receives an estimated position signal $x_{est}$. The output from the comparator 20 is a position error $\epsilon_x$ that is delivered to a first controller 21, possibly including, in conventional manner a proportional integral differential (PID) stage, filter members, saturation members, . . . . The output from the first controller 21 is a rotary speed setpoint $\bar{\omega}$ for the electric motor 6, also referred to as the commanded speed of rotation.

The commanded speed of rotation $\bar{\omega}$ is delivered to a positive input of a comparator 23 having its negative input receiving a measured speed of rotation signal $\omega_{mes}$ coming from a rotation sensor 24 disposed on the electric motor 6 to measure the speed of rotation thereof directly. It should be observed that the estimated position signal $x_{est}$ is generated in this example by an integrator 25 on the basis of the measured speed of rotation $\omega_{mes}$. The output from the comparator 23 is a rotary speed error $\epsilon_\omega$ that is delivered to a second controller 26 that generates the command 11 for application to the converter 10.

According to the invention, the converter 10 is powered via a controlled switch 30 that is normally closed so as to power the converter 10, but that is opened under the following conditions. The command 31 for the controlled switch 30 is applied to an AND gate 32 having the following two inputs:
the output from a first comparator 33 that compares the measured speed of rotation $\omega_{mes}$ of the electric motor 6 with a first threshold $S_1$, this output being equal to 1 if the measured speed of rotation is less than the first threshold $S_1$; and
the output from a second comparator 34 that compares the commanded speed of rotation $\bar{\omega}$ of the electric motor 6 with a second threshold $S_2$, this output being equal to 1 if the commanded speed of rotation is less than the second threshold $S_2$.

Thus, the controlled switch is open only if both:
the measured speed of rotation is less than the first threshold $S_1$; and
the commanded speed of rotation is less than the second threshold $S_2$.

Under such conditions, the converter 10, and thus the electric motor 6 are no longer powered, such that the electromechanical actuator 1 is blocked because it is non-reversible. These conditions correspond to a situation in which no movement of the pusher is being commanded, and no movement of the pusher is taking place.

This interruption of power supply gives rise to a significant saving in energy, since the actuator is no longer powered unless it is required to act. Furthermore, the actuator does not include any specific blocking member, so there is no need to consume any electricity in order to keep the pusher free to move under drive from the motor.

The tests that lead to the power supply being interrupted are performed in this example on the basis of the parameters of the internal speed loop. In practice, the motors intended for such an application include a speed-of-rotation sensor, such that the information concerning measured speed of rotation is already available. Furthermore, the speed of rotation of the motor is usually servo-controlled and is thus involved in an internal control loop, if only to control the acceleration and the deceleration of the pusher, or its speed of approach when it docks against the disks, such that the commanded speed signal is also available.

It is thus very easy to manage the power supply to the actuator in accordance with the invention with an existing actuator, regardless of whether it is servo-controlled in position or in force.

In known manner, the two comparators 33, 34 may be associated with confirming circuits having respective outputs that switch to 1 only if the output from the associated comparator remains at 1 for a determined length of time, e.g. a few seconds. In a variant, a confirming circuit could be located between the AND gate 32 and the controlled switch 30. This makes it possible to avoid switching off the power supply in the event of movement of the pusher being commanded soon (i.e. in a length of time shorter than the confirmation time) after a situation has been detected in accordance with the invention that would lead to the power supply being switched off. This disposition avoids pointlessly fatiguing the electronic power components making up the controlled switch 30.

In practice, the thresholds $S_1$ and $S_2$ used are advantageously selected to be as low as possible, given the level of noise polluting the controlled and measured speed signals. Naturally, provision could be made to filter those signals in order to remove noise therefrom.

The invention is not limited to the embodiments described above, but on the contrary covers any variant using equivalent means to reproduce the essential characteristics of the invention as specified above.

In particular, although it is stated herein that the power supply is switched off or on by means of a power switch placed on the power supply line to the electric motor and upstream therefrom, other means could be provided for selectively switching off power, such as for example a command that selectively forces the switches of an inverter powering the electric motor into the open position.

What is claimed is:
1. A wheel brake for an aircraft, the brake comprising a support that receives at least one electromechanical actuator fitted with a pusher facing friction elements and movable under drive from an electric motor to apply a braking force selectively against the friction elements, wherein the actuator is non-reversible such that a reaction force applied on the pusher cannot cause the electric motor to turn, at least when the reaction force is below a given limit force, and wherein the actuator is associated with means for selectively switching off an electric power supply to the electric motor, which means allow power to be delivered to the actuator in normal circumstances, and switch off said power if:
the measured speed of rotation ($\omega_{mes}$) of the electric motor drops below a first predetermined threshold ($S_1$); and
the commanded speed of rotation ($\bar{\omega}$) of the electric motor drops below a second predetermined threshold ($S_2$).

2. A method of managing the electrical power supply to a non-reversible electromechanical actuator for a wheel brake of an aircraft, the electromechanical actuator being fitted with a pusher facing friction elements and movable under drive from an electric motor to apply a braking force selectively to the friction elements, the method including the step of switching off an electrical power supply to the actuator if:

the measured speed of rotation ($\omega_{mes}$) of the motor drops below a first predetermined threshold ($S_1$); and the commanded speed of rotation ($\overline{\omega}$) of the motor drops below a second predetermined threshold ($S_2$).

* * * * *